US011943616B2

United States Patent
Rajput et al.

(10) Patent No.: US 11,943,616 B2
(45) Date of Patent: Mar. 26, 2024

(54) METHODS, SYSTEMS, AND COMPUTER READABLE MEDIA FOR UTILIZING NETWORK FUNCTION IDENTIFIERS TO IMPLEMENT INGRESS MESSAGE RATE LIMITING

(71) Applicant: Oracle International Corporation, Redwood Shores, CA (US)

(72) Inventors: Jay Rajput, Bangalore (IN); Shashikiran Bhalachandra Mahalank, Bangalore (IN); Ankit Srivastava, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 336 days.

(21) Appl. No.: 17/134,635

(22) Filed: Dec. 28, 2020

(65) Prior Publication Data

US 2022/0159464 A1    May 19, 2022

(30) Foreign Application Priority Data

Nov. 13, 2020  (IN) .............................. 202041049614

(51) Int. Cl.
*H04W 48/08* (2009.01)
*H04W 12/08* (2021.01)
(Continued)

(52) U.S. Cl.
CPC ......... *H04W 12/08* (2013.01); *H04W 12/106* (2021.01); *H04W 28/0215* (2013.01);
(Continued)

(58) Field of Classification Search
CPC ............... H04W 12/08; H04W 12/106; H04W 28/0215; H04W 28/12; H04W 48/08; H04W 84/042; H04W 8/00
See application file for complete search history.

(56) References Cited

U.S. PATENT DOCUMENTS 8,619,688 B2   12/2013  Ramakrishna
10,104,123 B2  10/2018  Ganda et al.
(Continued)

FOREIGN PATENT DOCUMENTS

CN    102137428 B  *  10/2013
EP    3 570 515 A1    11/2019
(Continued)

OTHER PUBLICATIONS

Commonly-Assigned, Co-pending U.S. Appl. No. 17/192,800 for "Methods, Systems, and Computer Readable Media for Resource Object Level Authorization at a Network Function (NF)," (Unpublished, filed Mar. 4, 2021).
(Continued)

*Primary Examiner* — Lynn D Feild
*Assistant Examiner* — Abdullah Almamun
(74) *Attorney, Agent, or Firm* — Jenkins, Taylor & Hunt, P.A.

(57) ABSTRACT

Methods, systems, and computer readable media for ingress message rate limiting are disclosed. One method includes, at a network node, receiving a service request message from a service consumer network function and extracting, from the received service request message, an access token that includes a consumer network function instance identifier identifying the service consumer network function. The method further includes determining, using the consumer network function instance identifier, that an allowed ingress message rate associated with the service consumer network
(Continued)

function has been reached or exceeded and in response to determining that the allowed ingress message rate associated with the service consumer network function has been reached or exceeded, performing a message rate limiting action.

17 Claims, 8 Drawing Sheets

(51) Int. Cl.
*H04W 12/106* (2021.01)
*H04W 28/02* (2009.01)
*H04W 28/12* (2009.01)
*H04W 84/04* (2009.01)

(52) U.S. Cl.
CPC ........... *H04W 28/12* (2013.01); *H04W 48/08* (2013.01); *H04W 84/042* (2013.01)

(56) References Cited

U.S. PATENT DOCUMENTS

| | | | |
|---|---|---|---|
| 11,553,524 | B2 | 1/2023 | Singh et al. |
| 2007/0118653 | A1* | 5/2007 | Bindal ................... H04L 47/10 709/226 |
| 2007/0165627 | A1* | 7/2007 | Sultan ................... H04L 47/10 370/389 |
| 2010/0272036 | A1 | 10/2010 | Ramakrishna |
| 2013/0128887 | A1* | 5/2013 | Shah ....................... H04L 12/18 370/390 |
| 2017/0085591 | A1 | 3/2017 | Ganda et al. |
| 2017/0230779 | A1* | 8/2017 | Wang ..................... H04W 72/51 |
| 2018/0089249 | A1 | 3/2018 | Collins et al. |
| 2018/0332629 | A1* | 11/2018 | Huang .................. H04W 48/18 |
| 2019/0253894 | A1 | 8/2019 | Bykampadi et al. |
| 2020/0007335 | A1* | 1/2020 | Tan ....................... H04L 9/3247 |
| 2020/0267214 | A1 | 8/2020 | Yang |
| 2020/0403924 | A1* | 12/2020 | Jiang .................. H04L 47/6275 |
| 2021/0152380 | A1* | 5/2021 | Yan ......................... H04L 67/14 |
| 2021/0168215 | A1 | 6/2021 | Zong et al. |
| 2021/0240554 | A1* | 8/2021 | Landais .................. H04L 67/30 |
| 2021/0288973 | A1 | 9/2021 | Dimble et al. |
| 2021/0297896 | A1* | 9/2021 | Landais .................. H04L 69/22 |
| 2021/0306326 | A1* | 9/2021 | Bykampadi .......... H04L 63/0281 |
| 2022/0052992 | A1* | 2/2022 | Zhang ................... H04L 9/3213 |
| 2022/0086734 | A1* | 3/2022 | Aggarwal ........... H04L 63/0807 |
| 2022/0182835 | A1 | 6/2022 | Rajput |
| 2022/0287089 | A1 | 9/2022 | Singh et al. |
| 2022/0353255 | A1* | 11/2022 | S Bykampadi ....... H04L 63/083 |
| 2023/0007475 | A1* | 1/2023 | He ........................ H04W 60/06 |

FOREIGN PATENT DOCUMENTS

| | | |
|---|---|---|
| EP | 3 188 069 B1 | 3/2020 |
| KR | 10-2011-0108416 A | 10/2011 |
| WO | WO 2022/098405 A1 | 5/2022 |
| WO | WO 2022/125212 A1 | 6/2022 |
| WO | WO 2022/186911 A1 | 9/2022 |

OTHER PUBLICATIONS

"3rd Generation Partnership Project; Technical Specification Group Core Network and Terminals; 5G System; Principles and Guidelines for Services Definition; Stage 3 (Release 17)," 3GPP TS 29.501, V17.0.0, pp. 1-78 (Dec. 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
Commonly-Assigned, Co-pending U.S. Appl. No. 17/115,746 for "Methods, Systems, and Computer Readable Media for Automatic Key Management of Network Function (NF) Repository Function (NRF) Access Token Public Keys for 5G Core (5GC) Authorization to Mitigate Security Attacks," (Unpublished, filed Dec. 8, 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
Jones et al., "JSON Web Token (JWT)," RFC 7519, pp. 1-30 (May 2015).
Jones et al., "JSON Web Signature (JWS)," RFC 7515, pp. 1-59 (May 2015).
Jones et al., "The OAuth 2.0 Authorization Framework: Bearer Token Usage," RFC 6750, pp. 1-18 (Oct. 2012).
Hardt, "The OAuth 2.0 Authorization Framework," RFC 6749, pp. 1-76 (Oct. 2012).
Dierks et al., "The Transport Layer Security (TLS) Protocol Version 1.2," RFC 5246, pp. 1-104 (Aug. 2008).
Housley et al., "Internet X.509 Public Key Infrastructure Certificate and Certificate Revocation List (CRL) Profile," RFC 3280, pp. 1-129 (Apr. 2002).
"3rd Generation Partnership Project; Technical Specification Group Services and System Aspects; Security architecture and procedures for 5G system (Release 16)," 3GPP TS 33.501, V16.3.0, pp. 1-248 (Jul. 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-209 (Jul. 2020).
Notice of Allowance and Fee(s) Due for U.S. Appl. No. 17/192,800 (dated Jun. 14, 2022).
Ericsson, "Cleanup, including removal of Editor's Notes," 3GPP TSG-SA3 Meeting #100e, pp. 1-48 (Aug. 17-28, 2020).
Notification of Transmittal of the International Search Report and the Written Opinion of the International Searching Authority, or the Declaration for International Application No. PCT/US2022/013268 (dated Apr. 7, 2022).
Notification of Transmittal of the International Search Report and the Written Opinion of the International Searching Authority, or the Declaration for International Application No. PCT/US2021/057158 (dated Jan. 27, 2022).
Notification of Transmittal of the International Search Report and the Written Opinion of the International Searching Authority, or the Declaration for International Application No. PCT/US2022/0138268 (dated Apr. 7, 2022).
Non-Final Office Action for U.S. Appl. No. 17/192,800 (dated Feb. 24, 2022).
Oh et al. "Study on Access Permission Control for the Web of Thing," 17th International Conference on Advanced Communication Technology (ICACT), pp. 574-5801 (Aug. 2015).
Jiahui et al., "A New Model for Continuous Network Access Control of Trust Network Connection," IEEE, pp. 1-5 (2009).
"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-104 (Jul. 2020).
"3rd Generation Partnership Project; Technical Specification Group Core Network and Terminals; 5G System; Technical Realization of Service Based Architecture; Stage 3 (Release 17)," 3GPP TS 29.500, V17.0.0, pp. 1-82 (Sep. 2020).
Notification of Transmittal of the International Search Report and the Written Opinion of the International Searching Authority, or the Declaration for International Application No. PCT/US2021/042662 (dated Oct. 26, 2021).

(56) References Cited

OTHER PUBLICATIONS

Applicant-Initiated Interview Summary for U.S. Appl. No. 17/115,746 (dated Apr. 26, 2023).
Non-Final Office Action for U.S. Appl. No. 17/115,746 (dated Dec. 23, 2022).
Notice of Allowance and Fee(s) Due for U.S. Appl. No. 17/192,800 (dated Aug. 26, 2022).
Notice of Publication for European Patent Application Serial No. 21755217.3 (dated Aug. 17, 2023).
Final Office Action for U.S. Appl. No. 17/115,746 (dated Jul. 18, 2023).

* cited by examiner

| NETWORK FUNCTION ID | CURRENT MSG RATE (IN TPS) | ALLOWED MSG RATE (IN TPS) | MSG THROTTLE RATE (IN TPS) |
|---|---|---|---|
| NF1 | 50 | 100 | -- |
| NF2 | 50 | 40 | 10 |
| NF3 | 30 | 40 | -- |

802 — RECEIVE A SERVICE ACCESS REQUEST MESSAGE FROM A SERVICE CONSUMER NETWORK FUNCTION

804 — EXTRACT, FROM THE RECEIVED SERVIC ACCESS REQUEST MESSAGE, AN ACCESS TOKEN THAT INCLUDES A CONSUMER NETWORK FUNCTION INSTANCE IDENTIFIER IDENTIFYING THE SERVICE CONSUMER NETWORK FUNCTION

806 — DETERMINE, USING THE CONSUMER NETWORK FUNCTION INSTANCE IDENTIFIER, THAT AN ALLOWED INGRESS MESSAGE RATE ASSOCIATED WITH THE SERVICE CONSUMER NETWORK FUNCTION HAS BEEN REACHED OR EXCEEDED

808 — IN RESPONSE TO DETERMINING THAT THE ALLOWED INGRESS MESSAGE RATE ASSOCIATED WITH THE SERVICE CONSUMER NETWORK FUNCTION HAS BEEN REACHED OR EXCEEDED, PERFORM A RATE LIMITING ACTION

FIG. 8

METHODS, SYSTEMS, AND COMPUTER READABLE MEDIA FOR UTILIZING NETWORK FUNCTION IDENTIFIERS TO IMPLEMENT INGRESS MESSAGE RATE LIMITING

PRIORITY CLAIM

This application claims the priority benefit of Indian Provisional Patent Application Serial No. 202041049614, filed Nov. 13, 2020, the disclosure of which is incorporated herein by reference in its entirety.

TECHNICAL FIELD

The subject matter described herein relates to enhancing security in 5G communication networks. More particularly, the subject matter described herein relates to methods, systems, and computer readable media for utilizing network function identifiers to implement ingress message rate limiting.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF. In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing, and topology hiding for all application programming interface (API) messages.

However, there exists a need for improved security measures at one or more NFs.

SUMMARY

Methods, systems, and computer readable media for utilizing network function identifiers to implement ingress message rate limiting are disclosed. One example method includes, at a network node, receiving a service request message from a service consumer network function and extracting, from the received service request message, an access token that includes a consumer network function instance identifier identifying the service consumer network function. The method further includes determining, using the consumer network function instance identifier, that an allowed ingress message rate associated with the service consumer network function has been reached or exceeded and in response to determining that the allowed ingress message rate associated with the service consumer network function has been reached or exceeded, performing a message rate limiting action.

According to an aspect of the subject matter described herein, a method wherein the service request message is a service based interface (SBI) service request message.

According to an aspect of the subject matter described herein, a method wherein the consumer network function instance identifier is contained in a subject claim of the access token.

According to an aspect of the subject matter described herein, a method wherein the network node is further configured to extract a consumer public land mobile network (PLMN) identifier from a consumer PLMN claim in the access token.

According to an aspect of the subject matter described herein, a method the network node includes a security edge protection proxy (SEPP), a service producer network function, or a service communication proxy (SCP).

According to an aspect of the subject matter described herein, a method wherein determining that the allowed ingress message rate associated with the service consumer network function has been reached or exceeded comprises obtaining the allowed ingress message rate associated with the service consumer network function; obtaining a current ingress message rate associated with the service consumer network function; and comparing the current ingress message rate and the allowed ingress message rate for determining that the current ingress message rate meets or exceeds the allowed ingress message rate.

According to an aspect of the subject matter described herein, a method the message rate limiting action includes discarding the request message, generating or modifying a throttle rate for discarding a portion of ingress messages, or notifying a network operator or a management system.

One example system for ingress message rate limiting includes a network node comprising at least one processor and a memory. The network node is configured for wherein the network node is configured for: receiving a service request message from a service consumer network function; extracting, from the received service request message, an access token that includes a consumer network function instance identifier identifying the service consumer network function; determining, using the consumer network function instance identifier, that an allowed ingress message rate associated with the service consumer network function has been reached or exceeded; and in response to determining that the allowed ingress message rate associated with the service consumer network function has been reached or exceeded, performing a message rate limiting action.

According to an aspect of the subject matter described herein, a system wherein the service request message is a service based interface (SBI) service request message.

According to an aspect of the subject matter described herein, a system wherein the consumer network function instance identifier is contained in a subject claim of the access token.

According to an aspect of the subject matter described herein, a system wherein the network node is further configured to extract a consumer public land mobile network (PLMN) identifier from a consumer PLMN claim in the access token.

According to an aspect of the subject matter described herein, a system wherein the network node includes a security edge protection proxy (SEPP), a service producer network function, or a service communication proxy (SCP).

According to an aspect of the subject matter described herein, a system wherein determining that the allowed ingress message rate associated with the service consumer network function has been reached or exceeded comprises: obtaining the allowed ingress message rate associated with the service consumer network function; obtaining a current ingress message rate associated with the service consumer network function; and comparing the current ingress message rate and the allowed ingress message rate for determining that the current ingress message rate meets or exceeds the allowed ingress message rate.

According to an aspect of the subject matter described herein, a system wherein the message rate limiting action includes discarding the request message, generating or modifying a throttle rate for discarding a portion of ingress messages, or notifying a network operator or a management system.

One example non-transitory computer readable medium comprising computer executable instructions embodied in the non-transitory computer readable medium that when executed by at least one processor of at least one computer cause the at least one computer to perform steps comprising: at a network node, receiving a service request message from a service consumer network function and extracting, from the received service request message, an access token that includes a consumer network function instance identifier identifying the service consumer network function. The steps further include determining, using the consumer network function instance identifier, that an allowed ingress message rate associated with the service consumer network function has been reached or exceeded, and in response to determining that the allowed ingress message rate associated with the service consumer network function has been reached or exceeded, performing a message rate limiting action.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

Figure 1:
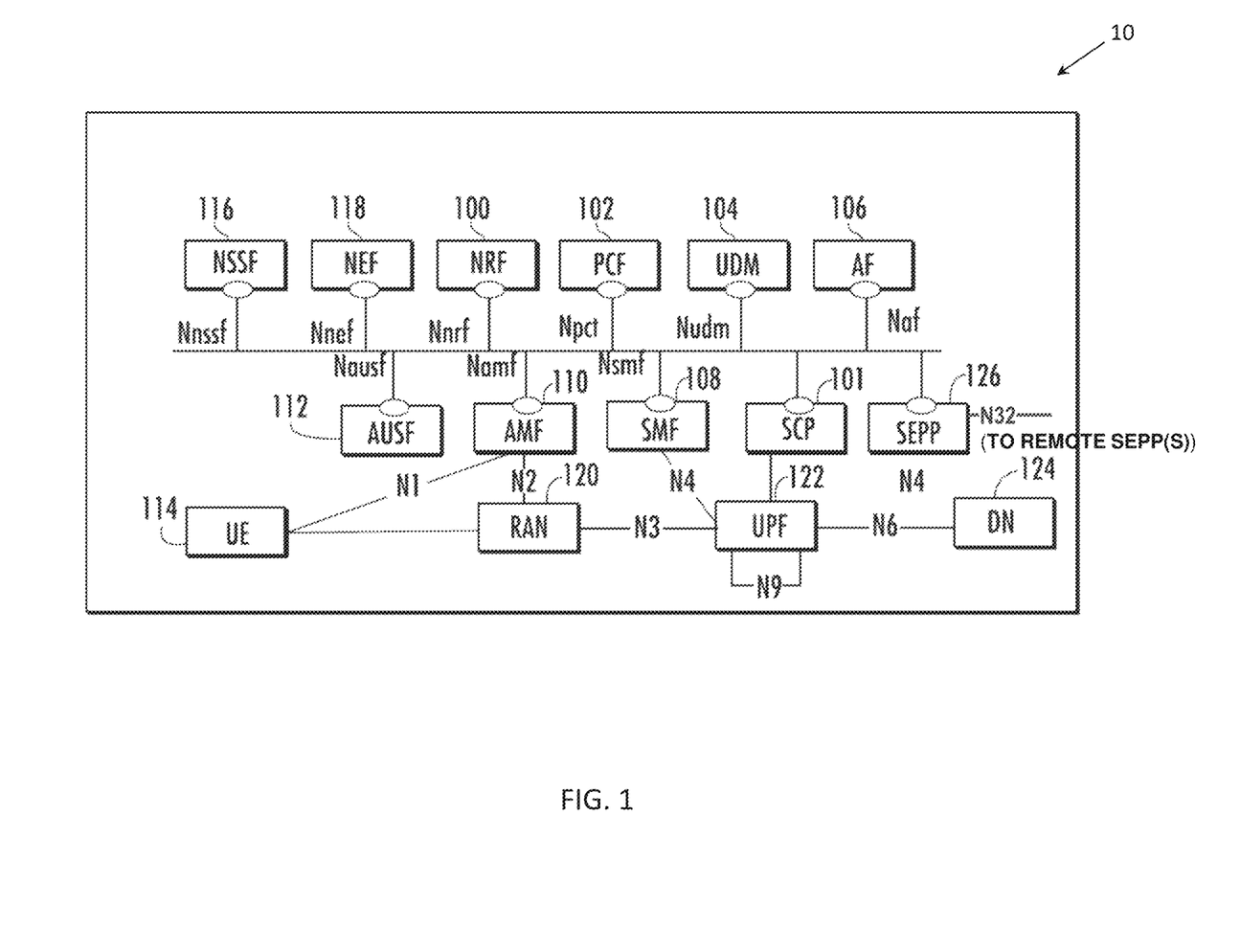
FIG. 1 is a network diagram illustrating an example 5G core network architecture.

FIG. 1 is a block diagram illustrating an example 5G system network architecture 10, e.g., a home 5G core (5GC) network. The architecture 10 in FIG. 1 includes a network function repository function (NRF) 100 and SCP 101, which may be located in the same home public land mobile network (PLMN). As described above, NRF 100 may maintain profiles of available producer network function (NF) service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC service requests and responses) between a consumer NF and a producer NF after applying application level security protection.

One potential issue with the existing 5G architecture is that a consumer NF can trigger a signaling storm by sending a significant number of service requests messages to a producer NF, SEPP, or SCP in a home PLMN. While the receiving producer NF, SEPP, or SCP in the home network can initiate a global message rate limiting process to reduce or mitigate consequences of the signaling storm from the culprit consumer NF, global message rate limiting can similarly discard messages from legitimate consumer NFs and SEPPS that are not responsible for or associated with the signaling storm at an equal rate.

Figure 2:
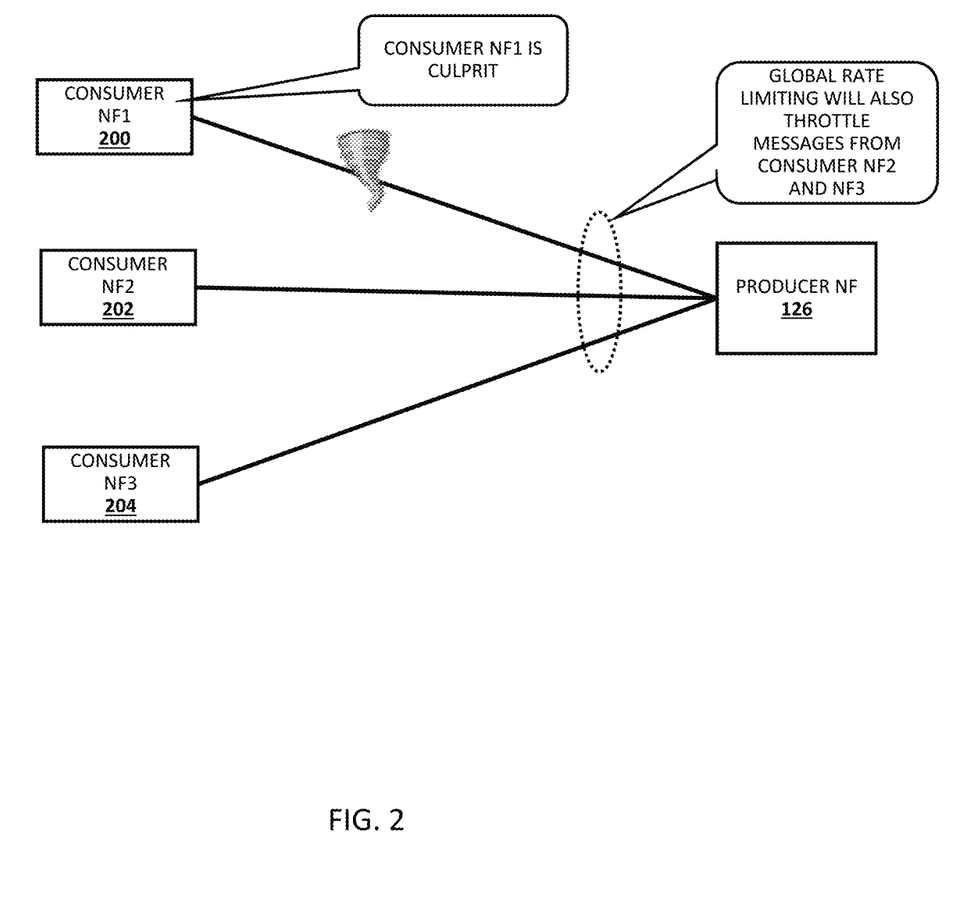
FIG. 2 is a block diagram illustrating example message signaling received by a service producer network function from service consumer network functions.

FIG. 2 is a diagram depicting the signaling connections existing between each of a plurality of service consumer network functions 200-204 and a service producer network function 126. In some embodiments, service producer network function 126 requires some manner of ingress rate limiting in order to protect itself against excessive 5GC signaling from subscribed consumer network functions. For example, service producer network function 126 may be configured with a global rate limiting functionality that serves to throttle or limit the number of ingress messages received from the consumer network functions. As shown in FIG. 2, producer network function 126 may be configured to receive signaling messages from multiple consumer network functions 200-204. Out of the multiple consumer network functions that are sending messages, one or more consumer functions may be sending an excess number of signaling messages which causes the producer network function 126 to initiate a message throttling mechanism that manages the ingress rate of messages received at the producer network function 126. While global message rate limiting measures can mitigate the negative effects of a signaling storm from a particular consumer network function (e.g., consumer network function 200), such rate limiting may also unfairly discard or throttle traffic associated with legitimate consumer network functions (e.g., consumer network functions 202-204) that are not responsible for or associated with the signaling storm. As shown in FIG. 2, the global rate limiting mechanism executed by the producer network function will throttle all incoming messages and improperly throttle consumer network functions (e.g., consumer network functions 202-204) that are sending messages in accordance with a permissible limit or threshold. As such, consumer network functions 202-204 are throttled to the same degree as the culprit consumer network function (e.g., consumer network function 200).

In some embodiments of the disclosed subject matter, a network node can be provisioned with a message rate limiting engine (as discussed in further detail below). Notably, a message rate limiting engine can be configured to maintain monitor a current messaging rate originating from a particular consumer network function and determine if that rate exceeds a permissible threshold. To accomplish this, the message rate limiting engine at a network node can be configured to recognize an access token (and an included consumer network function instance identifier) that may be stored in an HTTP and/or JSON message header of a service access message sent by a consumer network function. In some embodiments, the access token may be an OAuth2 access token that is requested from an authorization server, such as an NRF.

Figure 3:
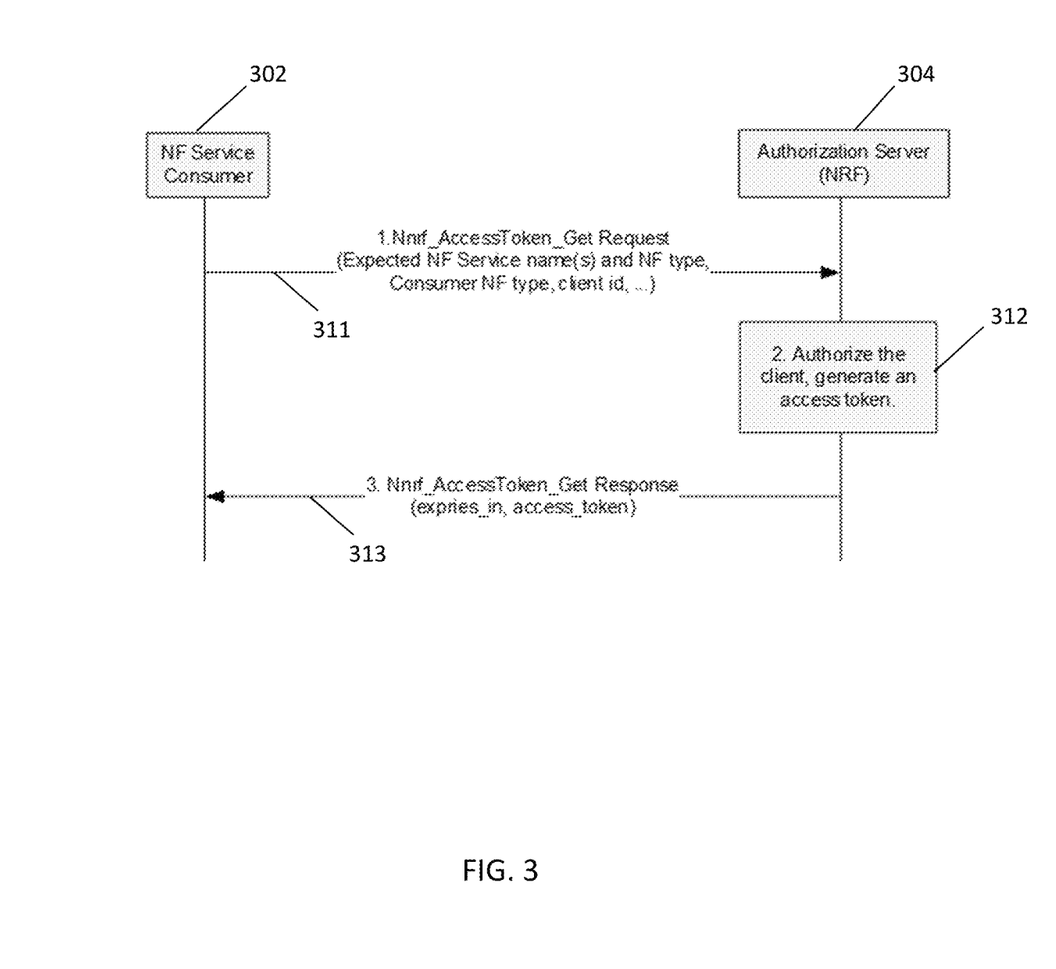
FIG. 3 is a message flow diagram illustrating a FIG. 3 is a message flow diagram illustrating an access token request procedure.

FIG. 3 is a message flow diagram illustrating an access token request procedure that is conducted by a consumer network function. Referring to FIG. 3, a service consumer network function 302 may send an access token request message 311 to an authorization server 304 (e.g., an NRF). In particular, request message 311 comprises an Nnrf_AcessToken_Get Request message that specifies an expected NF service name and NF type, the service consumer network function type, a client identifier, and the like. Upon receiving request message 311, authorization server 304 is configured to authorize the requesting client (i.e., service consumer network function 302) and generate a unique encoded access token (e.g., OAuth2 access token) for that client. After generating the encoded access token, authorization server 304 generates and sends a response message 313 that is directed to service consumer network function 302. In particular, response message 313 may include an Nnrf_AccessToken_Get Response message that includes the encoded access token generated by the authorization server and its corresponding expiration time.

Once service consumer network function 302 obtains the necessary service access authorization by successfully fetching the access token, service consumer network function 302 can be configured to include the acquired access token in a network function service request message (e.g., an SBI service request message) to the service producer network function. Specifically, the service consumer network function can embed an encoded access token in the network function service request message that is sent to the service producer network function. In response to receiving the network function service request message, the service producer network function is configured to extract the encoded access token from the service request message. In particular, the service producer network function can be adapted to verify the integrity and the claims contained in the access token. If the claims and integrity in the access token are successfully verified, the service producer network function is configured to permit access to the requested service to the service consumer network function. Namely, the service producer network function may be configured to send a network function service response message to the service consumer network function that indicates that the requested service is authorized and will be accessible.

Figure 4:
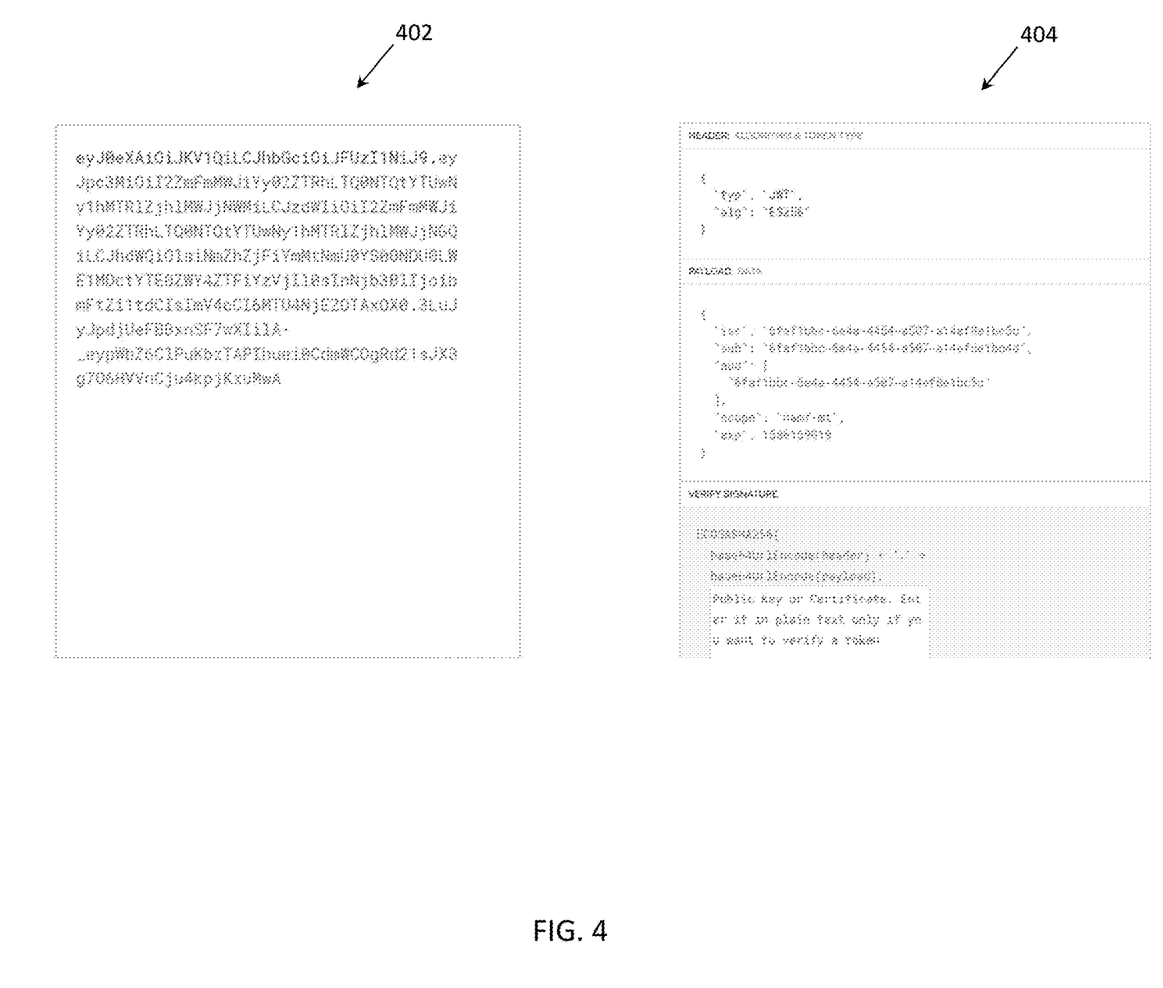
FIG. 4 depicts an exemplary encoded access token and corresponding decoded access token.

FIG. 4 depicts an exemplary encoded access token 402 and decoded access token 404. Notably, encoded access token 402 is received in this form by the consumer network function from an authorization server or NRF. Encoded access token 402 is further used in an HTTP header of service request messages generated and sent by consumer network functions. The encoded access token is ultimately decoded by a receiving producer network function and/or its message rate limiting engine as discussed further below.

Figure 5:
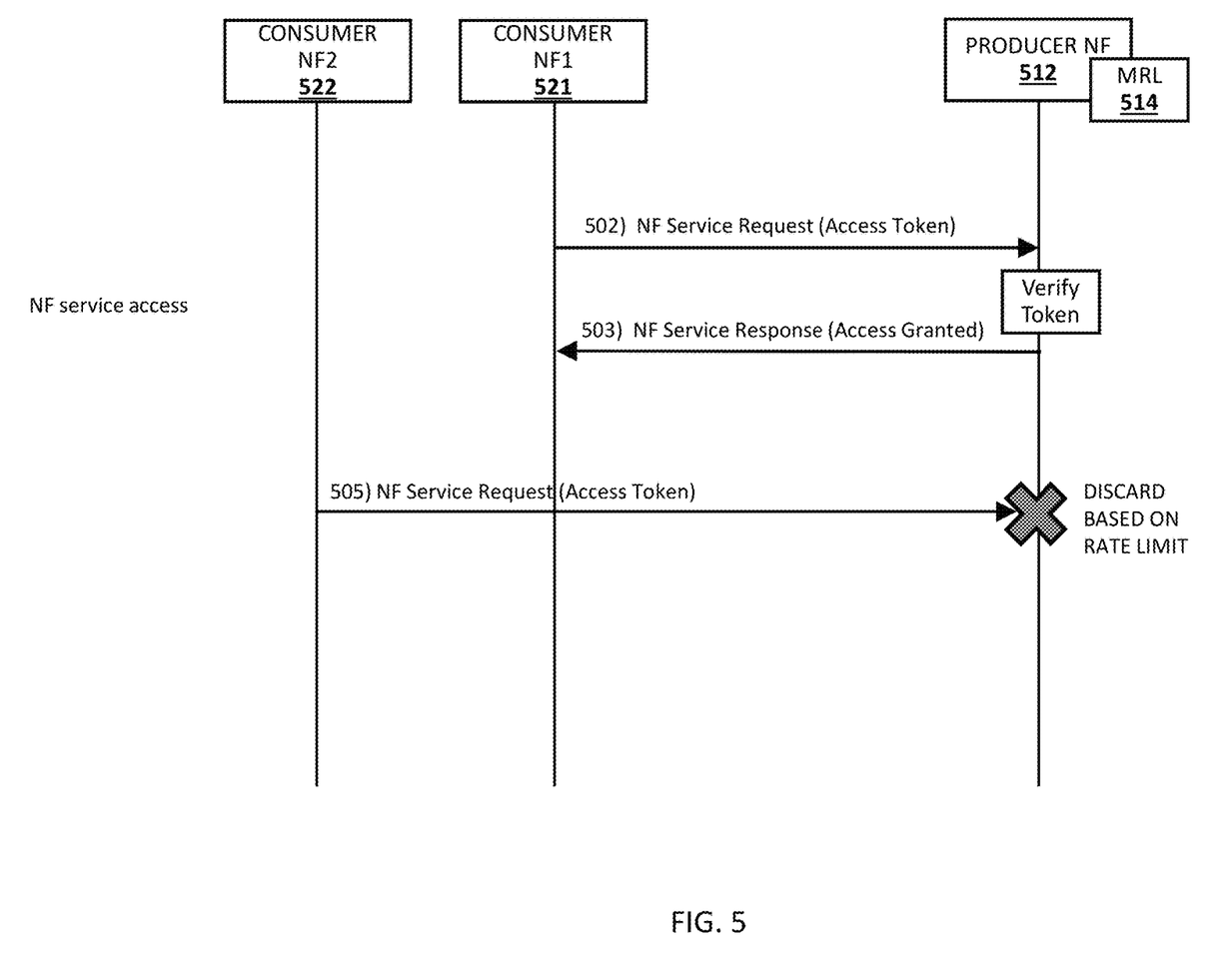
FIG. 5 is a message flow diagram illustrating an example of ingress message rate limiting executed by a message rate limiting engine.

FIG. 5 depicts a message signaling diagram that illustrates an exemplary rate limiting technique that is performed by a message rate limiting engine 514. As shown in FIG. 5, message rate limiting engine 514 is hosted by service producer network function 512. In alternate embodiments, message rate limiting engine 514 is hosted by a SEPP or SCP node. FIG. 5 further illustrates a pair of consumer network functions 521-522. As shown in FIG. 5, service producer network function 512 can be configured with a record database (e.g., see record database 700 as discussed below and shown in FIG. 7) that may contain a plurality of record entries that respectively correspond to service consumer network functions that have communicated with the service producer network function (or host of the message rate limiting engine 514).

As shown in FIG. 5, service producer network function 512 receives a NF service request message 502 from service consumer network function 521. Notably, service request message 502 includes an encoded access token that was previously obtained by service consumer network function 521 (e.g., from an NRF as described above with regard to FIG. 3). Moreover, the access token includes a plurality of claims, any of which can be accessed by the message rate limiting engine 514. For example, one claim in the access token is a subject claim that contains a consumer network function instance identifier that identifies the sending consumer network function 521. Another accessible claim in the access token includes a consumer PLMN identifier. Although the following description primarily describes the access and extraction of identifier data from the subject claim and the consumer PLMN claim, any claim included in the access token may be accessed by the message rate limiting engine for identification information that can be used for rate-limiting purposes without departing from the scope to the disclosed subject matter.

Figure 7:
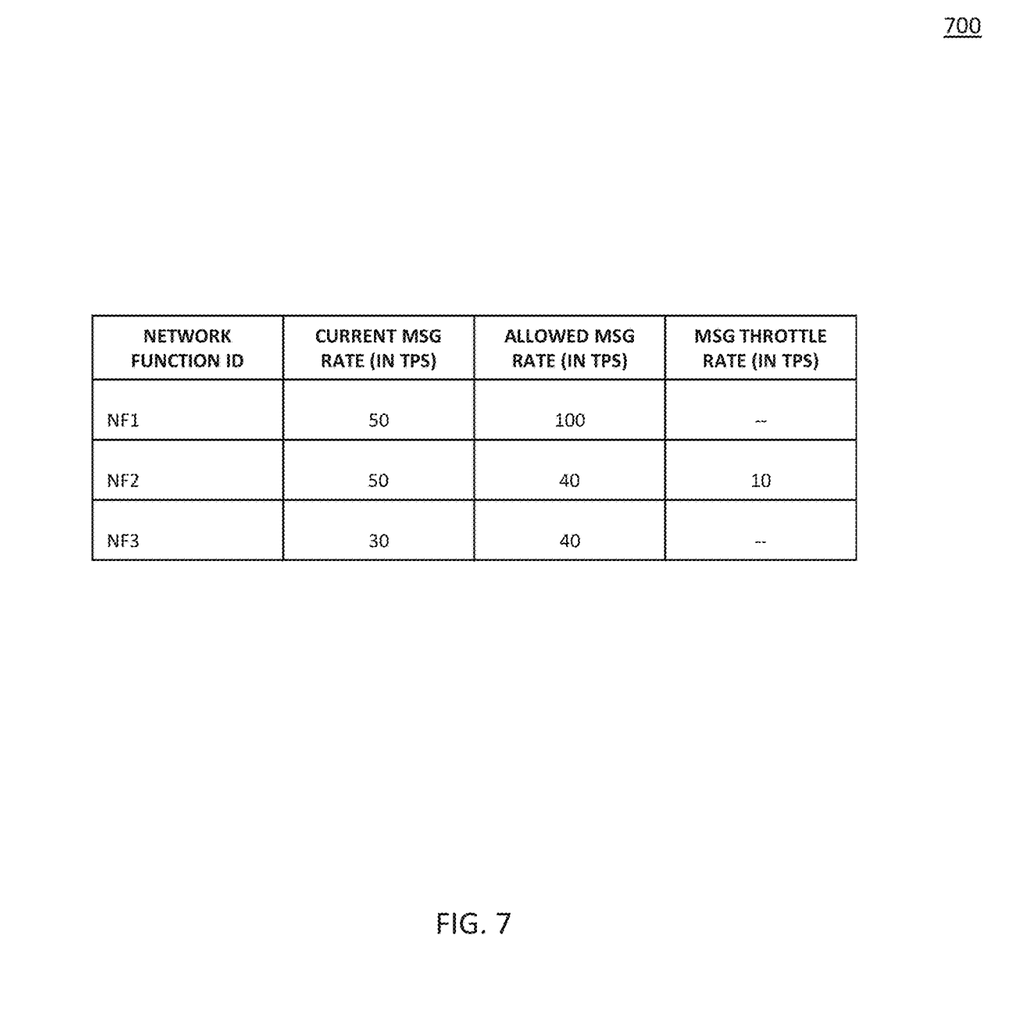
FIG. 7 is a diagram illustrating an example message throttling rate related record database.

After receiving service request message 502 and the access token, service producer network function 512 and/or the message rate limiting engine 514 is configured to decode the encoded access token and initiate an access token verification and service authorization procedure (see block 503). For example, message rate limiting engine 514 may be configured to verify the integrity of the claims included in the access token. Notably, message rate limiting engine 514 is configured to obtain the consumer network function instance identifier that uniquely identifies the consumer network function 521 from the subject claim of the decoded access token (and/or obtain a consumer PLMN identifier that uniquely identifies a consumer PLMN from the consumer PLMN claim of the decoded access token). Once the consumer network function instance identifier is obtained, message rate limiting engine 514 is configured to utilize the consumer network function instance identifier to cross-reference the entries of the record database. In particular, the record database may include network function identifiers (and/or consumer PLMN identifiers, consumer NF group identifiers, or the like) and associated message rate limiting parameters (e.g., as shown in FIG. 7). By comparing the consumer network function instance identifier with one or more of the consumer network function identifiers included in the entries of the record database, message rate limiting engine 514 is able to determine any existing messaging restrictions placed on the particular service consumer network function 521. For example, message rate limiting engine 514 may access the record database and determine various messaging information pertaining to service consumer network function, such as the current messaging rate performed by network function 521, a predefined allowed message rate for network function 521, and a message throttle rate that is currently applied (if applicable) to the sending service consumer network function. In the event that message rate limiting engine 514 verifies the integrity of the access token and further determines that service consumer network function 521 is communicating in a manner that adheres to an acceptable ingress message rate for the producer network function 512, message rate limiting engine 514 will send a service response message to the consumer network function 521 that indicates that access to the requested service has been granted. Further, message rate limiting engine 514 will continue to permit consumer network function 521 to communicate with producer network function 512 without executing any message rate limiting or throttling actions.

In a second scenario illustrated in FIG. 5, service consumer network function 522 sends its own network function service request message to service producer network function 512. Similar to message 502 indicated above, service request message 505 includes an encoded access token that was previously obtained by service consumer network function 522 (e.g., from an NRF). Further, the encoded access token also includes a plurality of accessible claims, one of which is a subject claim that contains a consumer network function instance identifier that uniquely identifies the sending consumer network function 522. Another accessible claim is a consumer PLMN claim that contains a consumer PLMN identifier that uniquely identifies a sending consumer PLMN.

After receiving service request message 505 and the access token, service producer network function 512 and/or the message rate limiting engine 514 is configured to decode the access token and initiate the access token verification and service authorization procedure (similar to block 503). For example, message rate limiting engine 514 may be configured to verify the integrity of the claims in the received access token. Notably, message rate limiting engine 514 is configured to obtain the consumer network function instance identifier that uniquely identifies the consumer network function 523 from the subject claim of the access token (and/or the consumer PLMN identifier from the consumer PLMN claim). Once the consumer network function instance identifier is obtained, message rate limiting engine 514 is configured to utilize the network function instance identifier to cross-reference the entries of the record database. By comparing the consumer network function instance identifier with one or more of the network function identifiers included in the entries of the record database, message rate limiting engine 514 is able to determine any messaging restrictions placed on the particular service consumer network function 522. For example, message rate limiting engine 514 may access the record database and determine that a message throttle rate is currently being applied to the sending service consumer network function. In the event that message rate limiting engine 514 determines that service consumer network function 521 is subjected to a throttling rate for ingress messages to producer network function 512, message rate limiting engine 514 will execute a message rate limiting or throttling actions. For example, message rate limiting engine 514 may be configured to discard a number of messages sent by consumer network function 522 based on an established rate limit that is predefined in the record database. More specifically, message rate limiting engine 514 can restrict ingress messaging to the producer network function 512 from service consumer network function 522 to a particular messaging throttle rate (e.g., 10 TPS) as defined in the record database (see, e.g., database 700 in FIG. 7).

It will be appreciated that FIG. 5 is for illustrative purposes and that different and/or additional messages and/or actions may be used. It will also be appreciated that various messages and/or actions described herein may occur in a different order or sequence.

Figure 6:
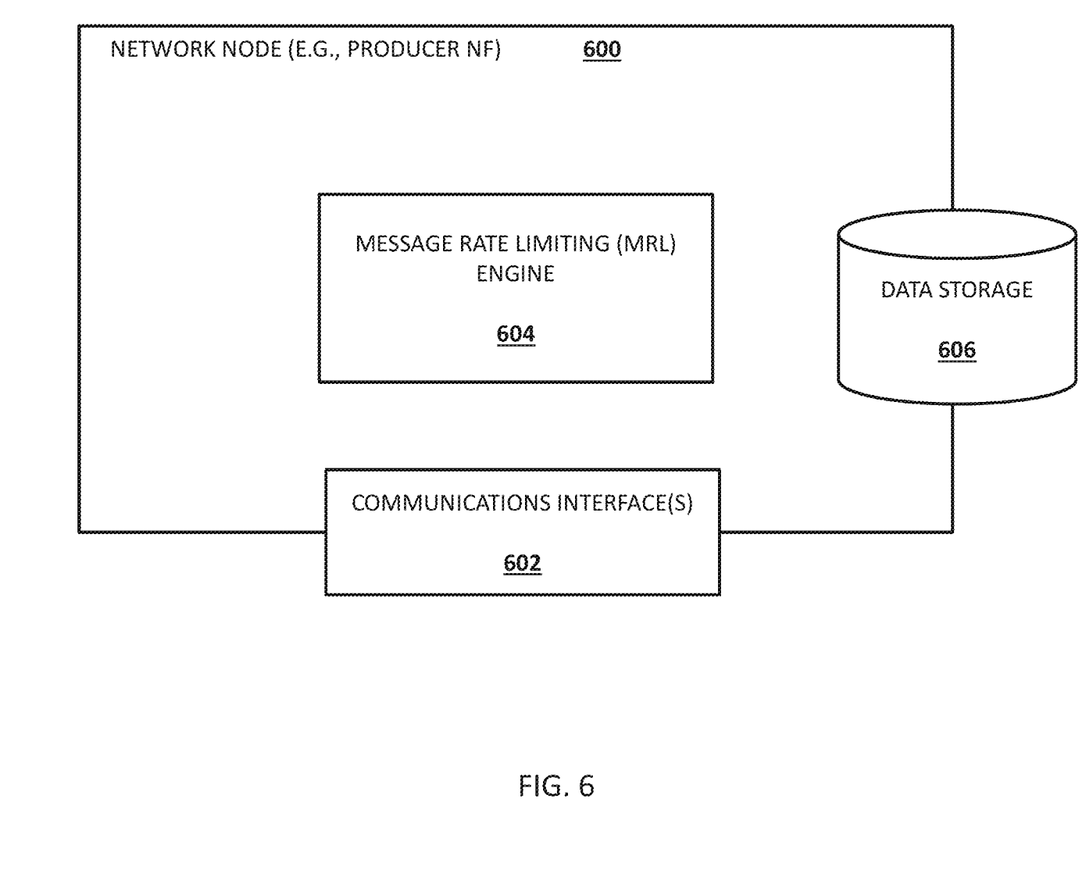
FIG. 6 is a diagram illustrating an example network node configured for ingress message rate limiting.

FIG. 6 is a diagram illustrating an example network node 600 configured for utilizing network function identifiers to implement ingress message rate limiting. Network node 600 may represent any suitable entity or entities for performing aspects of ingress message rate limiting. In some embodiments, node 600 may represent or include one or more 5GC network functions, e.g., a service producer network function, a SEPP, an SCP, or the like. In some embodiments, network node 600 may represent or include a network gateway, a network proxy, an edge security device, or any related computing device that is configured to host a NF, SEPP, and/or SCP node or functionality. In some embodiments, network node 600 may include any producer network function, such as an NRF, PCF, BSF, NSSF, NEF, UDM/AUSF, UDR, UDSF, and the like.

In some embodiments, network node 600 or a related module may be configured (e.g., via programming logic) to perform ingress message rate limiting on 5GC service request messages based on a consumer network function instance identifier that corresponds with the originating service consumer network function. By performing ingress message rate limiting in this manner, network node 600 (e.g., a service producer network function) is able to reduce or mitigate the impact of incoming 5GC request signaling storms on the network node or other downstream network functions in the home network. For example, network node 600 or a related module may be configured to identify a consumer network function instance identifier included in an access token (e.g., OAuth2 access token). More specifically, the consumer network function instance identifier is included in a subject claim that is contained within the access token. In some embodiments, the network node, message rate limiting engine, or related module is further configured to extract a consumer PLMN identifier from a consumer PLMN claim in the access token. As described below, this consumer PLMN identifier can be used by the network node and/or message rate limiting engine to execute a rate limiting procedure on the sending consumer PLMN.

In some embodiments, the network node and/or message rate limiting engine is configured to group multiple service consumer network functions for rate limiting purposes. In such scenarios, the network node and/or message rate limiting engine will require some configuration conducted by a network operator or administrator for enabling the grouping of the consumer NFs.

Referring to FIG. 6, network node 600 may include one or more communications interface(s) 602 for communicating messages via a communications environment, e.g., a home 5GC network. In some embodiments, communications interface(s) 602 may include a first communication interface for communicating with one or more service consumer network functions and/or SEPPs in a first network, a second communications interface for communicating with one or more service consumer network functions and/or SEPPs in a second network, and a third communications interface for communicating with one or more service consumer network functions and/or SEPPs in a home network, e.g., a home 5GC network.

Network node 600 may include a message rate limiting (MRL) engine 604. Message rate limiting engine 604 may be any suitable entity (e.g., software executing on at least one processor) for performing one or more aspects of disclosed ingress message rate limiting. In some embodiments, message rate limiting engine 604 may include functionality for obtaining, from a service request message sent from a service consumer network function, a consumer network function instance identifier identifying the originating service consumer network function and using the network function instance identifier to perform ingress message rate limiting functions at the network node 600. For example, obtaining a consumer network function instance identifier from a 5GC signaling message may include obtaining the instance identifier from an HTTP header contained in an access token included in the 5GC-based network function service request message.

In this example, for each 5GC service acccess request message received by network node 600, message rate limiting engine 604 may determine, using the consumer network function instance identifier, whether an allowed ingress message rate associated with the sending consumer network function instance identifier has reached or exceeded a predefined threshold value. In response to determining that the allowed ingress message rate associated with the network function instance identifier has reached or exceeded the threshold value, message rate limiting engine 604 may perform a message rate limiting action. Examples of rate limiting actions may include discarding a received request message, generating or modifying a throttle rate for discarding a portion of ingress messages sent by a particular consumer service network function, and/or notifying a network operator or a management system regarding an ingress message rate or related event.

In some embodiments, message rate limiting engine 604 may be configured for determining whether to perform ingress message rate limiting by obtaining an allowed ingress message rate associated with a consumer service network function, obtaining a current ingress message rate associated with the consumer service network, function, and comparing the current ingress message rate and the allowed ingress message rate. If the current ingress message rate meets or exceeds the allowed ingress message rate, then a message rate limiting action may be performed. If the current ingress message rate meets or exceeds the allowed ingress message rate, then message rate limiting engine 604 may allow the message to be handled or processed, e.g., without ingress message rate limiting.

In some embodiments, network node 600 may access (e.g., read from and/or write information to) data storage 606. Data storage 606 may be any suitable entity (e.g., a computer readable medium or memory) for storing various data. In some embodiments, data storage 606 may include logic for obtaining identifiers from access tokens, logic for checking whether to perform ingress message rate limiting, logic for implementing or triggering a message rate limiting action, and logic for tracking current ingress message rates associated with various originating entities (e.g., consumer service network function instant identifiers, PLMN IDs, etc.).

In some embodiments, data storage 606 may include message rate limiting data. For example, data storage 606 may include information for identifying a current message rate, an allowed message rate, and/or a message throttle rate for various consumer network functions or network nodes therein. In this example, related message rates and throttle rates may be indexed or otherwise identified using an identifier obtained from a 5GC service accc,,s request message or an access token therein. Data store 606 may further be configured to store a record database, such as record database 700 shown in FIG. 7.

FIG. 7 is a diagram that depicts example message rate related data stored in a record database 700. Record database 700 may include information for identifying a current message rate, an allowed message rate, and/or a message throttle rate for various network functions and/or network nodes therein. For example, each rate in record database 700 may represent a number of messages, requests, or transactions per a time period, e.g., transactions per second (TPS).

Referring to FIG. 7, a table representing record database 700 comprises columns and/or fields for network and/or network function instance IDs, current message rates, allowed message rates, and message throttle rate. A network function identifier field may store information for representing a network function or an associated host network node. In some embodiments, record database 700 may include a consumer PLMN identifier field that can be used to conduct message rate limiting on a particular consumer PLMN. Similarly, in some embodiments, record database 700 may include a consumer NF group identifier field that can be used to conduct message rate limiting on a particular grouping of service consumer network functions.

A current message rate field may store information for representing a measured or tracked message rate associated with one or more messages, types of messages, or transactions. For example, a current message rate (e.g., 50 TPS) may indicate a measured rate of 5GC service request messages or transactions received from a particular consumer network function.

An allowed message rate field may store information for representing a predetermined allowed message rate associated with one or more messages, types of messages, or transactions. For example, an allowed message rate (e.g., 40 TPS) may indicate a rate of 5GC service request messages or transactions received from a particular consumer network function that a network node (e.g., a producer network node, SCP, or SEPP) is configured to allow, e.g., without performing a message rate limiting action.

A message throttle rate field may store information for representing a message throttle rate associated with one or more messages, types of messages, or transactions. For example, a message throttle rate may indicate a rate of inter-5GC service request messages or transactions received from a particular consumer network function that a network node (e.g., a producer network node, SCP, or SEPP) is to throttle or discard. In this example, a throttle rate may be based on the difference between a current message rate and an allowed message rate, e.g., 50 TPS −40 TPS =10 TPS.

It will also be appreciated that record database 700 is for illustrative purposes and that different and/or additional data than the data depicted in FIG. 7 may be usable for indicating default values for particular data portions or other information. Further, record database 700 may be stored (e.g., in a database record in data storage 606 as shown in FIG. 6) or managed using various data structures and/or computer readable media.

Figure 8:
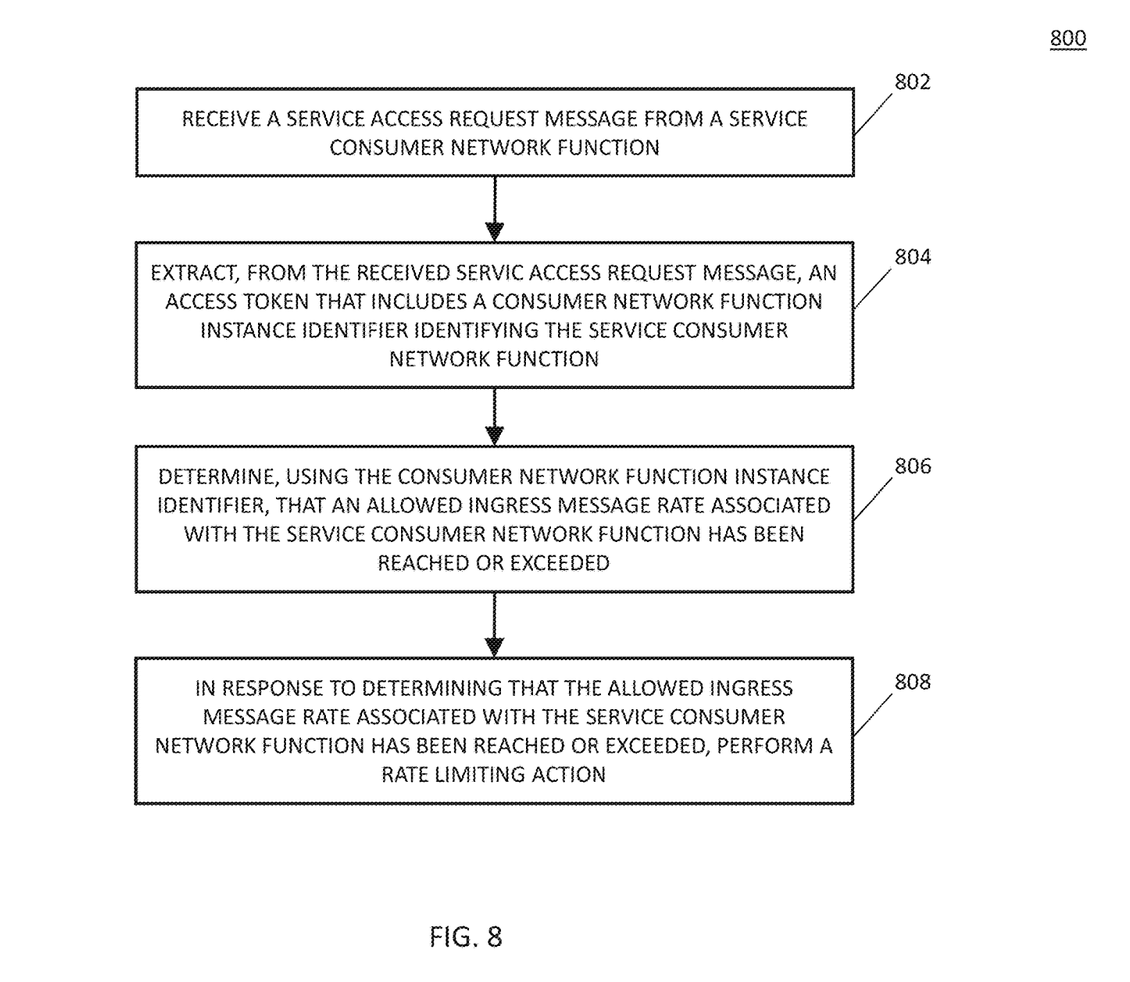
FIG. 8 is a flow chart illustrating an example process for utilizing network function identifiers to implement ingress message rate limiting.

FIG. 8 is a diagram illustrating an example process 800 for ingress message rate limiting. In some embodiments, example process 800 described herein, or portions thereof, may be performed at or performed by network node 600, message rate limiting engine 604, and/or another module or node.

In step 802, a 5GC service acccss request message is received from a service consumer network function. In some embodiments, the request message is received by a network node, such as an SEPP, SCP, a producer NF, or any other node comprising message rate limiting engine 604 in a home 5GC network.

In step 804, an access token that includes a consumer network function instance identifier is extracted from the received 5GC service request message. In some embodiments, the message rate limiting engine obtains the consumer network function instance identifier contained in a claim of the access token. Notably, the consumer network function instance identifier uniquely identifies the sending service consumer network function. In some embodiments, the network node and/or message rate limiting engine extracts a consumer PLMN identifier from a consumer PLMN claim in the access token.

In step 806, it may be determined, using the consumer network function instance identifier, that an allowed ingress message rate associated with the sending service consumer network function has been reached or exceeded. For example, a producer network function may utilize a consumer network function instance identifier obtained from the access token (see step 804) associated with an originating service consumer network function to determine whether the messages sent by a particular service consumer network function is reaching or exceeding an ingress message rate. In this example, producer network function may query a data store or database that contains current ingress message rates and allowed message rates indexed by or associated with relevant identifiers (e.g., a consumer network function instance identifier). In some embodiments, an extracted consumer PLMN identifier can be used by the network node and/or message rate limiting engine to determine if an allowed ingress message rate associated with the sending consumer PLMN has been reached or exceeded.

In some embodiments, determining that an allowed ingress message rate associated with a particular sending service consumer network function has been reached or exceeded may comprise i) obtaining the allowed ingress message rate associated with the service consumer network function, ii) obtaining a current ingress message rate associated with the service consumer network function, and iii) comparing the current ingress message rate and the allowed ingress message rate for determining that the current ingress message rate meets or exceeds the allowed ingress message rate.

In step 808, in response to determining that the allowed ingress message rate associated with the service consumer network function has been reached or exceeded, a message rate limiting action may be performed. In some embodiments, a message rate limiting action performed by the producer network function and/or the message rate limiting engine may include discarding a request message, generating or modifying a throttle rate for discarding a portion of messages, or notifying a network operator or a management system. In some embodiments, a message rate limiting action may be performed by the network node and/or the message rate limiting engine in response to determining that the allowed ingress message rate associated with the sending consumer PLMN has been reached or exceeded.

It will be appreciated that process 800 is for illustrative purposes and that different and/or additional actions may be used. It will also be appreciated that various actions described herein may occur in a different order or sequence.

It will be appreciated that while some aspects of the subject matter described herein has been discussed with reference to 5G networks various other networks may utilize some aspects of the subject matter described herein. For example, any network that utilize certificates that identify senders or related networks may use features, mechanisms and techniques described herein to perform more selective message rate limiting.

It should be noted that network node 600, message rate limiting engine 604, and/or functionality described herein (e.g., as shown in FIG. 6) may constitute a special purpose computing device. Further, node 600, message rate limiting engine 604, and/or functionality described herein can improve the technological field of network security and/or message rate limiting at a producer network function, SEPP, SCP, or other network node. For example, by performing ingress message rate limiting based on a consumer NF identifier, malicious activities (e.g., signaling traffic storms) and their negative consequences (e.g., network congestion, service failures, and/or poor user experience) can be mitigated and/or prevented.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 33.501; $3^{rd}$ Generation Partnership Project; Technical Specification Group Services and System Aspects; Security Architecture and Procedures for the 5G System; (Release 16), V16.3.0 (2020-07).
2. 3GPP TS 29.510; $3^{rd}$ Generation Partnership Project; Technical Specification Group Core Network and Terminals; 5G System; Network Function Repository Services; Stage 3 (Release 16), V16.4.0 (2020-07).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for utilizing network function identifiers to implement ingress message rate limiting, the method comprising:
    at a network node:
        receiving a service request message from a service consumer network function;
        extracting, from the received service request message, an access token that includes a consumer network function instance identifier identifying the service consumer network function;
        determining, by using the consumer network function instance identifier to identify and count messages received from the consumer network function within a time period, that a rate of messages transmitted by the consumer network function to the network node exceeds an allowed ingress message rate of messages from the service consumer network function to the network node, comprising:
            obtaining the allowed ingress message rate of messages from the service consumer network function;
            obtaining a current ingress message rate of messages from the service consumer network function by identifying and counting, using the consumer network function instance identifier, messages received from the consumer network function within the time period; and
            comparing the current ingress message rate of messages from the service consumer network function and the allowed ingress message rate of messages from the service consumer network function for determining that the current ingress message rate exceeds the allowed ingress message rate; and
        in response to determining that the current ingress message rate of messages from the service consumer network function exceeds the allowed ingress message rate of messages from the service consumer network function, performing a message rate limiting action.

2. The method of claim 1 wherein the service request message is a service based interface (SBI) service request message.

3. The method of claim 1 wherein the consumer network function instance identifier is contained in a subject claim of the access token.

4. The method of claim 1 wherein the network node is further configured to extract a consumer public land mobile network (PLMN) identifier from a consumer PLMN claim in the access token.

5. The method of claim 1 wherein the network node includes a security edge protection proxy (SEPP), a service producer network function, or a service communication proxy (SCP).

6. The method of claim 1 wherein the message rate limiting action includes discarding the request message, generating or modifying a throttle rate for discarding a portion of ingress messages, or notifying a network operator or a management system.

7. A system for utilizing network function identifiers to implement ingress message rate limiting, the system comprising:

a network node comprising:
  at least one processor; and
  a memory,
  wherein the network node is configured for:
    receiving a service request message from a service consumer network function;
    extracting, from the received service request message, an access token that includes a consumer network function instance identifier identifying the service consumer network function;
    determining, by using the consumer network function instance identifier to identify and count messages received from the consumer network function within a time period, that a rate of messages transmitted by the consumer network function to the network node exceeds an allowed ingress message rate of messages from the service consumer network function to the network node, comprising:
      obtaining the allowed ingress message rate of messages from the service consumer network function;
      obtaining a current ingress message rate of messages from the service consumer network function by identifying and counting, using the consumer network function instance identifier, messages received from the consumer network function within the time period; and
      comparing the current ingress message rate of messages from the service consumer network function and the allowed ingress message rate of messages from the service consumer network function for determining that the current ingress message rate exceeds the allowed ingress message rate; and
    in response to determining that the current ingress message rate of messages from the service consumer network function exceeds the allowed ingress message rate of messages from the service consumer network function, performing a message rate limiting action.

8. The system of claim 7 wherein the service request message is a service based interface (SBI) service request message.

9. The system of claim 7 wherein the consumer network function instance identifier is contained in a subject claim of the access token.

10. The system of claim 7 wherein the network node is further configured to extract a consumer public land mobile network (PLMN) identifier from a consumer PLMN claim in the access token.

11. The system of claim 7 wherein the network node includes a security edge protection proxy (SEPP), a service producer network function, or a service communication proxy (SCP).

12. The system of claim 7 wherein the message rate limiting action includes discarding the request message, generating or modifying a throttle rate for discarding a portion of ingress messages, or notifying a network operator or a management system.

13. A non-transitory computer readable medium having stored thereon executable instructions that when executed by a processor of a computer control the computer to perform steps comprising:
  at a network node:
    receiving a service request message from a service consumer network function;
    extracting, from the received service request message, an access token that includes a consumer network function instance identifier identifying the service consumer network function;
    determining, by using the consumer network function instance identifier to identify and count messages received from the consumer network function within a time period, that a rate of messages transmitted by the consumer network function to the network node exceeds an allowed ingress message rate of messages from the service consumer network function to the network node, comprising:
      obtaining the allowed ingress message rate of messages from the service consumer network function;
      obtaining a current ingress message rate of messages from the service consumer network function by identifying and counting, using the consumer network function instance identifier. messages received from the consumer network function within the time period; and
      comparing the current ingress message rate of messages from the service consumer network function and the allowed ingress message rate of messages from the service consumer network function for determining that the current ingress message rate exceeds the allowed ingress message rate; and
    in response to determining that the current ingress message rate of messages from the service consumer network function exceeds the allowed ingress message rate of messages from the service consumer network function, performing a message rate limiting action.

14. The non-transitory computer readable medium of claim 13 wherein the service request message is a service based interface (SBI) service request message.

15. The non-transitory computer readable medium of claim 13 wherein the consumer network function instance identifier is contained in a subject claim of the access token.

16. The non-transitory computer readable medium of claim 13 wherein the network node includes a security edge protection proxy (SEPP), a service producer network function, or a service communication proxy (SCP).

17. The non-transitory computer readable medium of claim 13 wherein the message rate limiting action includes discarding the request message, generating or modifying a throttle rate for discarding a portion of ingress messages, or notifying a network operator or a management system.

* * * * *